United States Patent Office 3,558,570
Patented Jan. 26, 1971

3,558,570
TELOMERS OF STYRENE AND MALEIC ACID ANHYDRIDE AND PROCESS FOR PREPARING THEM
Helmut Rinno, Lorsbach, Taunus, and Gerhard Werner, Hofheim, Taunus, Germany, assignors to Farbwerke Hoechst Aktiengesellschaft vormals Meister Lucius & Brüning, Frankfurt am Main, Germany, a corporation of Germany
Continuation-in-part of application Ser. No. 458,458, May 24, 1969, which is a continuation of application Ser. No. 802,743, Feb. 17, 1969. This application Aug. 25, 1969, Ser. No. 852,894
Claims priority, application Germany, May 30, 1964, F 43,023
Int. Cl. C08f 1/08, 19/02
U.S. Cl. 260—78.5                                    7 Claims

ABSTRACT OF THE DISCLOSURE

A process for preparing telomers of styrene and maleic acid anhydride of a molecular weight of less than 2500 is disclosed. Polymerization is effected at a temperature of 160° C. to 270° C. in the presence of a radical-forming catalyst and a chain-terminating solvent which may be benzene or a benzene substituted only by one or more methyl groups. The polymerization is preferably carried out at an elevated pressure.

---

The present application is a continuation-in-part of application of our application Ser. No. 458,458, filed May 24, 1965, now abandoned, and of streamlined continuation Ser. No. 802,743, filed Feb. 17, 1969, now abandoned and relates to telomers of styrene and maleic acid anhydride and a process for preparing them.

It is known that solutions of maleic acid anhydride and styrene in aromatic hydrocarbons, for example, benzene or xylene, can be polymerized at a temperature within the range of 40° C. to 150° C. In general maleic acid anhydride and styrene are copolymerized in a molar ratio of 1:1. When maleic acid anhydride and styrene are telomerised in an aromatic hydrocarbon (telogen), for example, cumene or ethyl benzene, which serves as a chain terminator, telomers of styrene and maleic acid anhydride of low molecular weight which contain molecules of the solvent form when the reaction is carried out at a temperature within the range of about 130° C. to 200° C. It is known that the molecular weight of polymers can be reduced by the addition of a modifier, for example, a halogenated hydrocarbon or a mercaptane, or by the increase of the reaction temperature and/or the catalyst concentration. It has been supposed, however, up to now that an increase of the temperature and the catalyst concentration does not suffice to enable low molecular weight telomers of styrene and maleic acid anhydride to be prepared in the presence of xylene and benzene. It has also been supposed that in a polymerization carried out in the presence of xylene and benzene the increase of the temperature and the catalyst concentration would involve explosions.

The present invention is based on the observation that telomers of styrene and maleic acid anhydride of a molecular weight of less than 2500 can advantageously be prepared by polymerizing styrene and maleic acid anhydride in an aromatic hydrocarbon in the presence of a radical-forming catalyst at a temperature above 150° C., when benzene or a benzene substituted only by one or more methyl groups is used as the aromatic hydrocarbon and the polymerization is carried out at a temperature within the range of 160° C. to 270° C.

As telogens there may be used benzene or benzenes substituted only by one or more methyl groups, for example, toluene, o-xylene, m-xylene, p-xylene, trimethyl benzenes, tetramethyl benzenes, pentamethyl benzene, and hexamethyl benzene, preferably toluene and xylene, in particular xylene. Depending on the boiling temperature of the solvent used and the desired reaction temperature, the reaction is carried out under atmospheric or, preferably, superatmospheric pressure.

The process according to the invention enables telomers of low molecular weight to be obtained in a quantitative yield after a short time of reaction without the addition of modifiers. Besides, since the heat of reaction is approximately equal to the heat required for heating the catalyst and monomer solutions the process according to the invention is not dangerous although the catalyst concentration and temperature used are in part high and although the process is preferably carried out under superatmospheric pressure and not under reflux of the solvents.

When sytrene and maleic acid anhydride are, for example, polymerized in xylene in a molar ratio of 1:1 at a reaction temperature within the range of 180° C. to 220° C. they are transformed into telomers having a molecular weight of 1600 and when they are reacted at a temperature of 240° C. their molecular weight is 760.

In the process according to the invention the solvent acting as a telogen, for example, xylene, is advantageously placed into the apparatus before the beginning of the reaction and heated to the desired reaction temperature which is within the range of 160° C. to 270° C., in particular 200° C. to 270° C. Then the solution of the monomers styrene and maleic acid anhydride and the catalyst solution are pumped in. The solution of styrene and maleic acid anhydride is heated to about 45° C. since maleic acid anhydride is not sufficiently soluble in styrene at room temperature. The catalyst may also be dissolved in the solution of styrene and maleic acid anhydride. But preferably it is dissolved in the solvent and introduced separately, so that a premature polymerization of the monomer solution is avoided. A part of the maleic acid anhydride may also be placed into the apparatus before the beginning of the reaction together with the solvent.

When the polymerisation is terminated the solvent is distilled off and the telomer is dried in vacuo at 150° C. The telomers or styrene and maleic acid anhydride which are obtained in a quantitative yield are colourless, brittle products which can be dissolved completely in dilute aqueous ammonia solutions. They have molecular weights within the range of 500 to 3,000, preferably to 2,000.

At the high temperatures according to the invention styrene and maleic acid anhydride may be polymerised in a molar ratio within the range of 2:1 to 1:2, a molar ratio of 1:1 being preferred.

As radical-forming catalysts may be used organic peroxides, for example, di-tert. butyl peroxide, dilauroyl peroxide, dibenzoyl peroxide or cumene hydroperoxide, and azo compounds, for example, azo bisisobutyronitrile, these substances being used in a proportion within the range of 0.5 to 10%, preferably 2 to 5%, calculated on the monomer mixture.

The telomers obtained by the process according to the invention and their reaction products with alcohols or amines can be used as textile auxiliaries or be processed into polycondensation products.

The following examples serve to illustrate the invention but they are not intended to limit it thereto. The viscosities indicated in the following examples were measured in a 10% solution in acetone at a temperature of 25° C. using a Hoeppler viscosimeter.

EXAMPLE 1

Starting materials

Mixture I:
    200 cc. of xylene
    47.5 g. of maleic acid anhydride
Mixture II:
    100 g. of styrene
    47.5 g. of maleic acid anhydride
Activator solution:
    6 g. of di-tert.butyl peroxide
    100 cc. of xylene Mixture I was placed at room temperature, under an atmosphere of nitrogen, into a steel autoclave having a capacity of 1 liter and provided with stirrer, thermometer, manometer and connecting pieces for the monomer and catalyst inlet pipes. The mixture in the autoclave was heated. At 120° C. the autoclave was relieved from pressure and the pumping in of mixture II which had been heated to 45° C. and of the activator solution began. The introduction of mixture II by pumping took 30 minutes and that of the activator solution took 35 minutes. During these operations the temperature of the reaction mixture rose to 200° C. and the pressure rose to 4.2 atmospheres. After the addition of the activator solution the mixture was heated for another 30 minutes at 190° C. Then the xylene was distilled off and the telomer of styrene and maleic acid anhydride which remained was dried at 150° C. under a pressure of 0.5 mm. of mercury. It was a colourless brittle substance which dissolved completely in dilute aqueous ammonia. The product was obtained in a yield of 205 grams, it had a molecular weight of 1630 and a viscosity of 0.95 centistoke.

EXAMPLE 2

Starting materials

Mixture I:
    300 cc. of xylene
    100 g. of styrene
    95 g. of maleic acid anhydride
    200 cc. of xylene
Mixture II:
    6 g. of di-tert.butylperoxide
    100 cc. of xylene 300 cc. of xylene were placed at room temperature under an atmosphere of nitrogen into the apparatus described in Example 1 and heated. At 250° C. the pumping in of mixtures I and II which had been heated to about 45° C. began. The introduction of mixture I took 4.5 minutes and that of mixture II took 5 minutes. During these operations the temperature of the reaction mixture rose to 260° C. and the pressure rose to 16 atmospheres. After the addition of mixture II heating was continued for 5 minutes. Then the mixture was cooled and the xylene was distilled off. The resulting product which was dried at 150° C. under a pressure of 0.5 mm. of mercury was colourless and brittle. The crude product was obtained in a yield of 200 grams, it had a molecular weight of 760 and a viscosity of 0.51 centistoke.

EXAMPLE 3

Starting materials

Mixture I:
    200 cc. of xylene
    100 g. of styrene
    150 g. of maleic acid anhydride
    200 cc. of xylene
Mixture II:
    7 g. of cumene hydroperoxide
    100 cc. of xylene The polymerisation was carried out in the manner described in Example 2. The crude product was obtained in a yield of 265 grams. The telomer had a molecular weight of 590 and a viscosity of 0.49 centistoke.

EXAMPLE 4

Starting materials

Mixture I:
    100 cc. of benzene
    100 g. of styrene
    95 g. of maleic acid anhydride
    100 cc. of benzene
Mixture II:
    6 g. of cumene hydroperoxide
    100 cc. of benzene The polymerisation was carried out in the manner described in Example 2. The yield of crude product amounted to 190 grams. The telomer had a molecular weight within the range of 1600 to 2000 as was ascertained by several tests. The viscosity of a telomer having a molecular weight of 2,000 was found to be 1.82 centistokes.

EXAMPLE 5

Starting materials

Mixture I:
    100 cc. of toluene
    100 g. of styrene
    95 g. of maleic acid anhydride
    100 cc. of toluene
Mixture II:
    6 g. of di-tert.butylperoxide
    100 cc. of toluene The polymerisation was carried out in the manner described in Example 2. The yield of crude product amounted to 185 grams. The telomer had a molecular weight of 1450 and a viscosity of 0.68 centistoke.

As compared with products obtained with other telogens, for example cumene or p-cymene, the products according to the invention are distinguished by a more narrow distribution of the molecular weight. Moreover, the films obtained with polyester lacquers made with the products according to the invention have a better flexibility as results from the following comparative examples:

(1) COMPARISON OF THE MOLECULAR WEIGHT DISTRIBUTION (a) A mixture of 8 kg. of xylene and 2.75 kg. of maleic acid anhydride was heated in a 40 l. steel autoclave to 200° C. and then a mixture of 2.75 kg. of maleic acid anhydride and 5.5 kg. of styrene and a solution of 0.25 kg. of di-tert. butylperoxide in 3.5 kg. of xylene were pumped in at the same time within 60 minutes. The temperature of the reaction mixture amounted to 200 to 215° C. After heating the reaction mixture at this temperature for another 30 minutes the solvent was distilled off. The product was obtained in a yield of 12.3 kg. The molecular weight (M.W.) of the product was determined by the isothermic distillation method and found to be about 750.

(b) Example (1a) was repeated using cumene instead of xylene as the solvent. The product was obtained in a yield of 13.2 kg. The molecular weight of the product was about 750.

(c) Example (1a) was repeated usin p-cymene instead of xylene as the solvent.

(d) The molecular weight distribution of the products obtained according to Example (1a), Example (1b) and Example (1c), respectively, were found by dissolving the product in benzene and fractionally precipitating it by means of n-hexane. The results were the following:

|  | Fraction 1 | | Fraction 2 | | Fraction 3 | |
|---|---|---|---|---|---|---|
|  | Percent by weight | M.W. | Percent by weight | M.W. | Percent by weight | M.W. |
| Example: | | | | | | |
| 1a. (xylene as telogen) | 75 | 850–900 | 25 | 400 | | |
| 1b. (cumene as telogen) | 15–20 | 1,100 | 60 | 950 | 20–25 | 400 |
| 1c. (p-cymene as telogen) | 14 | 1,200 | 67 | 980 | 21 | 410 |

(2) PREPARATION OF A LACQUER AND A FILM (a) 100 parts of the telomer obtained according to Example (1a), 40.5 parts of adipic acid, 60 parts of butanediol-(1.4) and 27 parts of butylglycol were melted and the mixture was esterified in a stirring flask at 140° C. until an acid number of 110 had been reached. The water formed in the reaction was removed from the reaction vessel by a nitrogen current.

The polyester resin was cooled to 80° C. and dissolved by adding 100 parts of water, 17 parts of diethylaminoethanol and 10 parts of a 25% aqueous ammonia solution. Ammonia solution was then added until a pH value of 6.8–7.5 had been reached.

35.8 parts of the resin solution obtained were mixed with 0.2 part of Arkopal® N 040, 2 parts of secondary butanol, 2 parts of diacetone alcohol, 1 part of methanol, 1 part of methyl acetate, 20 parts of titanium dioxide, 8 parts of barium sulfate, 8 parts of talcum, 4 parts of basic lead silicochromate, 17 parts of water and 1 part of nonlyalcohol.

This lacquer was applied to a degreased metal sheet by brushing and the sheet was heated at 150° C. for 30 minutes.

(b) Example (2a) was repeated using the telomer obtained according to Example (1b).

(c) Example (2a) was repeated using the telomer obtained according to Example (1c).

(d) The films prepared in the manner described above were subjected to the indentation test according to Erichsen (DIN 53 156) and to the mandrel bending test (DIN 53 152). The results were the following:

|  | DIN 53 156 | DIN 53 152 |
|---|---|---|
| 2a. (xylene as telogen), mm | 8 | 2 |
| 2b. (cumene as telogen), mm | 6 | 4 |
| 2c. (p-cymene as telogen), mm | 6 | 4 |

What is claimed is:

1. A process for preparing telomers of styrene and maleic acid anhydride of a molecular weight of less than 2500 which comprises polymerizing styrene and maleic acid anhydride at a temperature of 160° to 270° C. in the presence of a radical-forming catalyst and in a liquid medium consisting essentially wholly of a chain-terminating solvent which is benzene or a benzene substituted only by one or more methyl groups.

2. A process according to claim 1 and wherein the polymerisation is effected at an elevated autogenous pressure.

3. Telomers of styrene and maleic acid anhydride prepared by the process of claim 1.

4. Telomers of styrene and maleic acid anhydride prepared by the process of claim 2.

5. A process according to claim 1 wherein the chain-terminating solvent is xylene.

6. A process according to claim 1 wherein the chain-terminating solvent is benzene.

7. A process according to claim 1 wherein the styrene and maleic acid anhydride are polymerized in a molar ratio of 1:1.

References Cited

UNITED STATES PATENTS

| 3,388,106 | 6/1968 | Muskat | 260—78.5 |
| 3,418,292 | 12/1968 | Muskat | 260—78.5 |
| 3,474,114 | 10/1969 | Kuhlkamp et al. | 260—347.3 |

FOREIGN PATENTS

| 664,698 | 5/1965 | Belgium | 260—78.5 |

OTHER REFERENCES

Chemical Abstracts, vol. 52, p. 60b, 1958.

JAMES A. SEIDLECK, Primary Examiner

J. KIGHT III, Assistant Examiner